United States Patent [19]

Melnyk

[11] 4,332,068
[45] Jun. 1, 1982

[54] HEAT EXCHANGER ASSEMBLY

[75] Inventor: William Melnyk, Lathrup Village, Mich.

[73] Assignee: McCord Corporation, Detroit, Mich.

[21] Appl. No.: 168,478

[22] Filed: Jul. 14, 1980

Related U.S. Application Data

[62] Division of Ser. No. 970,483, Dec. 18, 1978, Pat. No. 4,300,628.

[51] Int. Cl.$^3$ ............................................. B23P 15/26
[52] U.S. Cl. .............................. 29/157.3 R; 165/149; 29/157.3 C
[58] Field of Search ......................... 165/122, 148–153, 165/173, 175, 83, 180; 180/68 R, 68 P; 29/157.3 R, 157.4, 157.3 C, 157.3 A, 157.3 B; 113/118 C, 118 A, 118 B

[56] References Cited

U.S. PATENT DOCUMENTS

| | | | |
|---|---|---|---|
| 1,320,652 | 11/1919 | Sonneborn | 29/157.3 A |
| 1,714,695 | 5/1929 | Rowe | 165/122 |
| 2,247,199 | 6/1941 | Kritzer | 29/157.3 A |
| 3,415,315 | 12/1968 | Donaldson et al. | 165/148 |
| 3,489,209 | 1/1970 | Johnson | 165/180 |
| 4,018,270 | 4/1977 | Kolinger et al. | 165/122 |

FOREIGN PATENT DOCUMENTS

| | | | |
|---|---|---|---|
| 106102 | 12/1938 | Australia | 165/175 |
| 970785 | 6/1950 | France | 29/157.4 |

*Primary Examiner*—Lowell A. Larson
*Assistant Examiner*—V. K. Rising
*Attorney, Agent, or Firm*—McGlynn and Milton

[57] ABSTRACT

A heat exchanger assembly and the method of making same wherein the heat exchanger assembly includes a heat exchanging core having spaced headsheets adjacent opposite extremities with fluid conveying tubes extending between the headsheets and having heat transfer fins disposed upon the tubes. Two plastic radiator components are disposed in mating engagement with one another with each component encasing one-half of the core and disposed in mating engagement with one another and defining spaced open cavities. Each of the components is in fluid-tight or sealed relationship with one another and with each of the headsheets disposed within the opening of each of the cavities so that the cavities and the headsheets define a pair of spaced tanks whereby fluid may flow between the tanks through the heat exchanging core. The headsheets are disposed in grooves within the components with a seal engaging the periphery of the headsheets and disposed in the grooves for sealing the headsheets to the respective components. The components include flanges extending peripherally thereabout with connecting means securing the flanges together to maintain the components in sealed relationship with one another. One of the components defines a rectangular opening for allowing air to flow therethrough while the other component defines a circular opening with a fan shroud and also includes inlet and outlet spouts associated with the respective tanks as well as a filler tube, all of which are integrally formed with the component. Each of the components include mounting portions extending outwardly from the flanges for mounting the assembly to a support structure.

3 Claims, 7 Drawing Figures

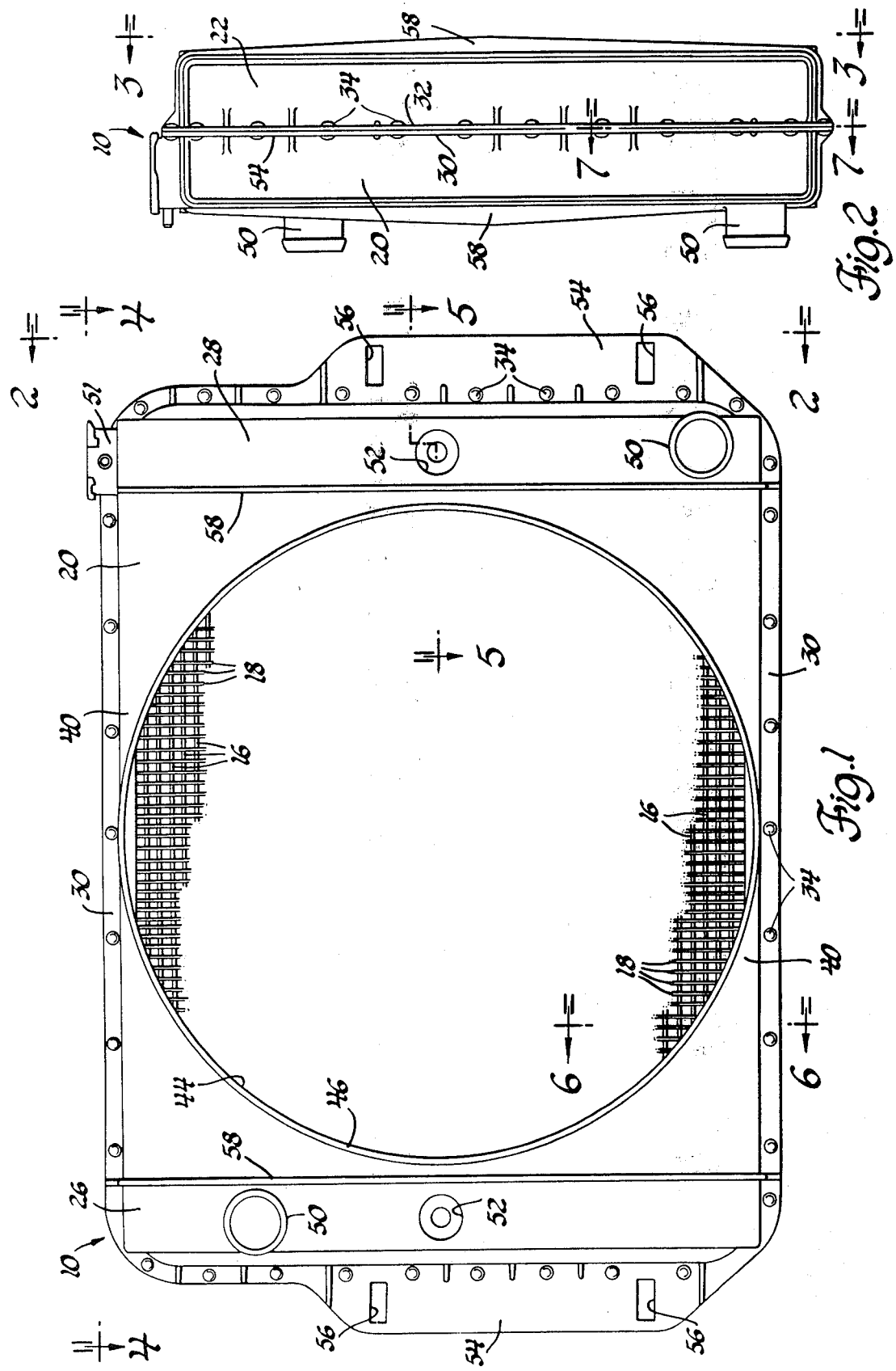

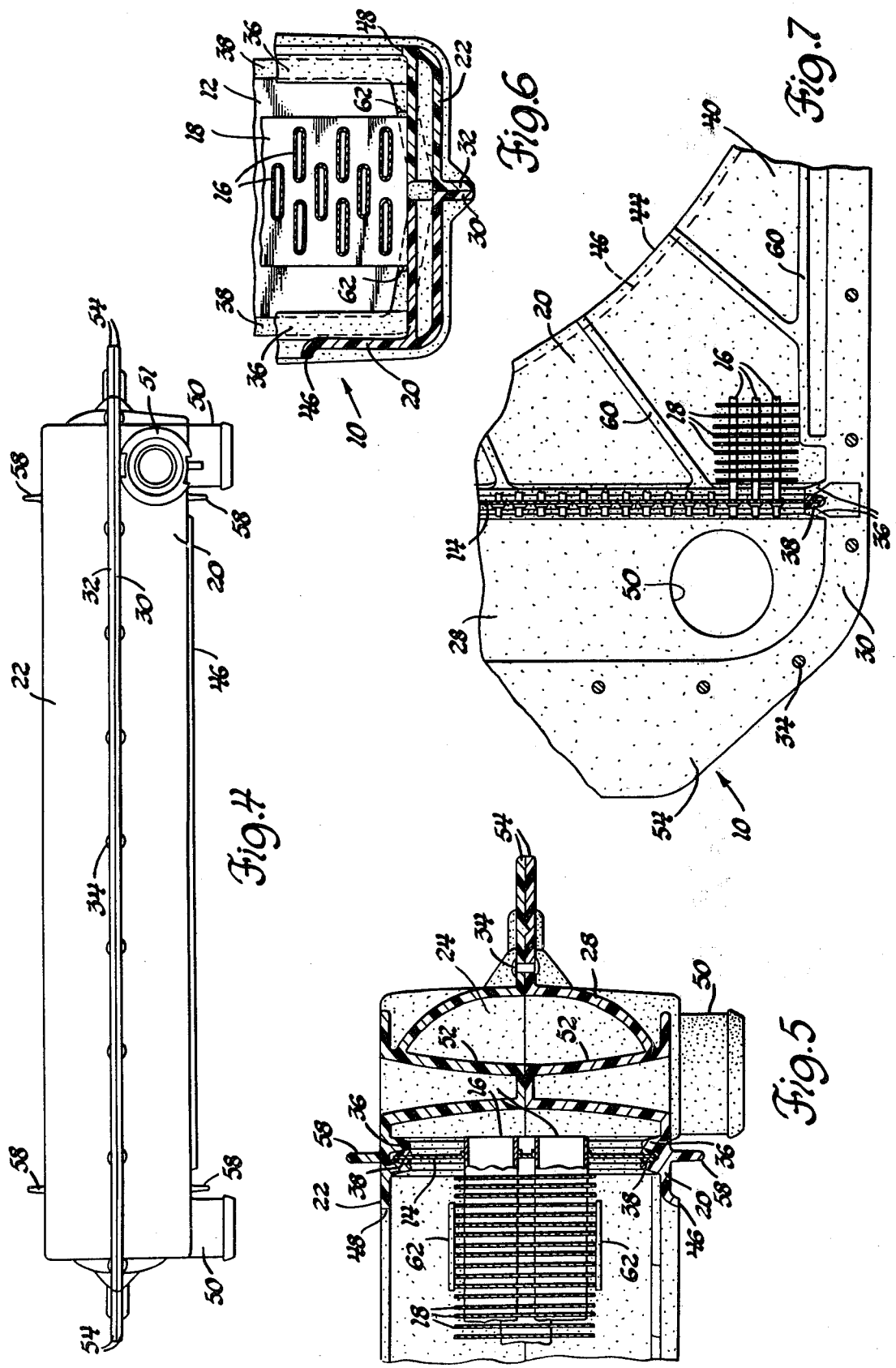

HEAT EXCHANGER ASSEMBLY

This application is a divisional of Application Ser. No. 970,483, filed Dec. 18, 1978, now U.S. Pat. No. 4,300,628, issued Nov. 17, 1981.

BACKGROUND OF THE INVENTION (1) Field of the Invention

The subject invention relates to a heat exchanger and, more particularly, to a heat exchanger of the type utilized as a radiator in an automotive vehicle, although the invention is applicable to other heat exchangers.

(2) Description of the Prior Art

In conventional heat exchanger assemblies, particularly those utilized in automotive engine cooling or heating operations, the construction consists of fabricating a group of individual parts usually made of metal and completing the heat exchanger in a final assembly operation. The individual parts usually consist of headers, tanks, leads, mounting brackets, side channels and a heat exchanging core. These various components are soldered or similarly secured together which requires skilled labor. Additionally, the fabrication of the various components must be skillfully accomplished to prevent leakage.

SUMMARY OF THE INVENTION

The subject invention provides a heat exchanger assembly including a heat exchanging core having spaced headsheets adjacent opposite extremities thereof with at least two radiator components in mating engagement with one another and defining an open cavity with the components being in fluid-tight relationship with at least one of the headsheets within the opening of the cavity so that the cavity and the headsheet define a tank whereby fluid may flow between the core and the tank.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a view of a preferred embodiment of the subject invention taking the form of a radiator assembly and showing the side thereof which would normally face the engine;

FIG. 2 is an end view taken substantially along line 2—2 of FIG. 1;

FIG. 4 is a top view taken substantially along line 4—4 of FIG. 1;

FIG. 5 is an enlarged fragmentary cross-sectional view taken substantially along line 5—5 of FIG. 1;

FIG. 6 is an enlarged fragmentary cross-sectional view taken substantially along 6—6 of FIG. 1; and FIG. 7 is an enlarged fragmentary cross-sectional view taken substantially along line 7—7 of FIG. 2.

DESCRIPTION OF THE PREFERRED EMBODIMENT

Figure 3:
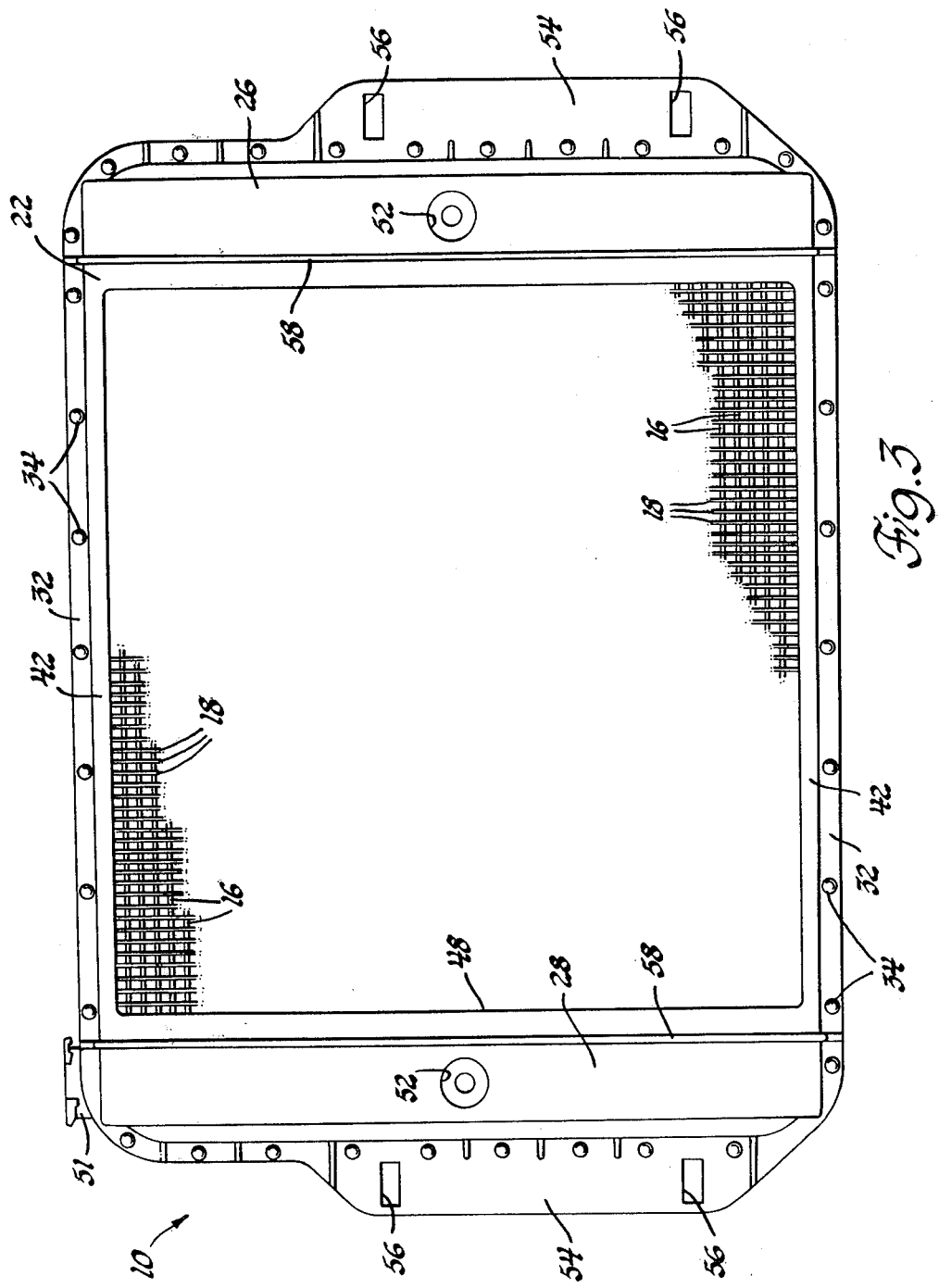
FIG. 3 is a view showing the front side of the assembly and taken substantially along line 3—3 of FIG. 2.

A preferred embodiment of a heat exchanger assembly constructed in accordance with the subject invention is generally shown at 10.

The heat exchanger assembly 10 includes a heat exchanging core including spaced headsheets 12 and 14 adjacent the opposite extremities of the core. The core includes tube elements 16 extending between and in sealed relationship with the headsheets 12 and 14. The tube elements 16 are generally oval in configuration, however, it will be appreciated they may be of various different configurations including being circular. The ends of the tube elements 16 extend through the respective headsheets 12 and 14 and are in sealed relationship therewith by being braised, soldered or otherwise secured to the headsheets 12 and 14. The core also includes a plurality of heat exchange fins or seats 18 spaced along the tube elements 16 to define heat transfer fins. The heat exchange sheets 18 are more narrow than are the headsheets 12 and 14.

The assembly 10 also includes two radiator components 20 and 22 in mating engagement with one another and defining spaced open cavities, one of which is shown at 24 in FIG. 5. Each component 20 and 22 is in fluid-tight relationship with each of the headsets 12 and 14 within the opening of each of the cavities 24 so that the cavities 24 and headsheets 12 and 14 define a pair of spaced tanks 26 and 28 whereby fluid flows between the tanks 26 and 28 through the tube elements 16. The components 20 and 22 are preferably made of a reinforced plastic material such as fiberglass reinforced plastic.

The components 20 and 22 include mating flanges 30 and 32 extending completely about the periphery of the respective components 20 and 22. There is also included connection means taking the form of rivets 34 for maintaining the flanges 30 and 32 in sealed and abutting relationship with one another completely about the periphery including the end portions along the cavities defining the tanks 26 and 28. It will be appreciated that connecting means other than the rivets may be utilized to secure the components together. For example, the two components may be sonic-welded or adhesively secured together.

The components 20 and 22 include sealing means disposed in sealing engagement with the periphery of the headsheets 12 and 14. Specifically, the sealing means includes grooves defined by the inwardly extending projections 36 and seals 38 disposed in the grooves and engaging and surrounding the periphery of the headsheets 12 and 14. The corners of the headsheets 12 and 14 are rounded with the headsheets 12 and 14 being flat and their entire periphery being disposed in sealed relationship with the components 20 and 22.

The components 20 and 22 include side portions 40 and 42 extending along each side of the core and defining an opening over the face of the core to allow air flow through the core. The opening in the component 20 is a circular opening 44 and the circular opening 44 includes a fan shroud 46 extending about the periphery thereof. The other component 22 has an opening 48 which is generally rectangular. As will be appreciated, the component 22 would normally face the fan blade of an engine with the fan blade rotating within the periphery of the opening 44. It will be appreciated that the fan shroud 46 may be of various different configurations.

Further, the component 20 having the circular opening 44 therein also includes inlet and outlet spouts 50 integrally formed therewith with the inlet spout extending from one of the tanks and the outlet spout extending from the other of the tanks. It will be appreciated that hot fluid from the engine flows into the inlet into one of the tanks and through the tube elements 16 to the other of the tanks and out the outlet after having been cooled by flowing through the tube elements 16. In addition, the component 20 has molded integrally therewith a filler spout 51 by which the assembly may be filled with a fluid.

The components 20 and 22 also include projections 52 extending into the cavities 24 forming the tanks 26 and 28 from opposite sides so that the projection 52 from the opposite components 20 and 22 are connected together for reinforcing the integrity of the respective tanks 26 and 28. The projections 52 may be connected together by a rivet or they may be sonically welded together or adhesively secured together. The projections 52 being connected together within the tanks and along the mid-portions thereof provide an additional strength factor to prevent the components 20 and 22 forming the tanks from separating under high pressure conditions. It will be appreciated that one or more of the projections 52 may be disposed along the respective tanks 26 and 28 depending upon the pressure requirements for the particular assembly.

There is also included mounting portions 54 extending outwardly from predetermined lengths of the flanges 30 and 32 for mounting the assembly to a support structure. The mounting portions 54 are actually extensions of the flanges 30 and 32 and include openings 56 extending therethrough for receiving appropriate attachment means for connecting the assembly to a support structure in a vehicle.

The components 20 and 22 include reinforcing ribs 58 extending on the exterior thereof directly opposite to the grooves defined by the projections 36 on the interior thereof. Further, the component 20 includes reinforcing ribs 60 on the interior thereof and extending radially over the portion defining the circular opening 44.

The assembly also includes locating tabs or ribs 62 disposed on the interior of the side portions of the components 20 and 22 for engaging opposite faces of the fins 18 of the core. The tabs or ribs 62 are illustrated in FIGS. 5 and 6 and may extend along a portion of the length of the core or may extend completely from one end to the other of the core.

The components 20 and 22 encase opposite halves of the core assembly and the mating flanges 30 and 32 may have coacting female and male recesses and projections for locating the components or aligning the components relative to one another during assembly.

In assembling the assembly, the core is placed in association with one of the components 20 or 22 by disposing the headsheets 12 and 14 thereof in the groove defined by the projections 36 of that particular component and thereafter the other component 20 or 22 is mated to the first component by having the headsheets 12 and 14 disposed in the groove thereof while the flanges 30 and 32 are placed in engagement with one another or aligned in the event that male and female projections are utilized whereby the tanks 26 and 28 are defined with the respective headsheets 12 and 14 at opposite extremities of the assembly. The seal 38 may be disposed about the periphery of the headsheets 12 and 14 before the components 20 and 22 are placed in engagement with one another. Further, a sealing means in the form of a gasket and adhesive, or the like, may be disposed upon the flanges 30 and 32 of the components 20 and 22 before they are placed in engagement to one another.

As will be appreciated, the subject assembly is made of two respective integral components 20 and 22 which may be mated together to define the tanks at each end of the assembly as well as the mounting portions.

The invention has been described in an illustrative manner, and it is to be understood that the terminology which has been used is intended to be in the nature of words of description rather than of limitation.

The embodiments of the invention in which an exclusive property or privilege is claimed are defined as follows:

1. A method of making a heat exchanger having a heat exchanging core with spaced headsheets with a tank associated with each headsheet including the steps of; disposing a first radiator component in engagement with a portion of the periphery of both of said headsheets, disposing a second radiator component in engagement with the remaining portion of the periphery of both of said headsheets and in engagement with said first radiator component to form a tank adjacent each of said headsheets and connecting said components together to form a fluid seal between said components and between said components and said one headsheet whereby fluid may flow between said tanks through said core.

2. A method as set forth in claim 1 including the step of disposing sealing means between the periphery of said headsheets and said components.

3. A method as set forth in claim 2 including the step of placing sealing means between said components before disposing said components in engagement with one another.

* * * * *